United States Patent [19]
Toda et al.
[11] 4,234,245
[45] Nov. 18, 1980

[54] LIGHT CONTROL DEVICE USING A BIMORPH ELEMENT

[75] Inventors: Minoru Toda; Susumu Osaka, both of Machida, Japan

[73] Assignee: RCA Corporation, New York, N.Y.

[21] Appl. No.: 898,538

[22] Filed: Apr. 20, 1978

[30] Foreign Application Priority Data

Apr. 22, 1977 [GB] United Kingdom ............... 16839/77
May 26, 1977 [GB] United Kingdom ............... 22263/77
May 26, 1977 [GB] United Kingdom ............... 22266/77

[51] Int. Cl.³ ........................ G05D 25/02; G09F 3/04; G09F 9/37

[52] U.S. Cl. ...................................... 350/269; 40/451; 310/331; 310/800; 340/763; 354/234

[58] Field of Search .................... 354/50, 51, 227, 234, 354/60 R, 271; 350/161 R, 269; 310/331, 332, 800, 322; 40/447, 450, 436, 437, 451, 452; 340/763, 764, 783

[56] References Cited

U.S. PATENT DOCUMENTS

| | | | |
|---|---|---|---|
| 2,016,025 | 10/1935 | Schribner et al. | 354/271 X |
| 3,110,824 | 11/1963 | Flanagan | 350/161 R X |
| 3,442,570 | 5/1969 | Picker | 350/161 R |
| 3,816,774 | 6/1974 | Ohnuki et al. | 310/800 X |
| 3,837,102 | 9/1974 | Golay | 40/28 C |
| 3,897,997 | 8/1975 | Kalt | 350/161 R |
| 3,964,014 | 6/1976 | Tehon | 310/322 X |
| 3,993,863 | 11/1976 | Leedom et al. | 358/128.5 |
| 4,089,927 | 5/1978 | Taylor | 310/800 X |
| 4,093,883 | 6/1978 | Yamamoto | 310/317 |

OTHER PUBLICATIONS

Report on Flat Type Loudspeaker by J. Ohga to I.E.C.E. of Japan, Sep. 27, 1972.
Paper presented to I.E.C.E. of Japan by M. Toda and S. Osaka, Mar. 1978.

*Primary Examiner*—Michael L. Gellner
*Attorney, Agent, or Firm*—Edward J. Norton

[57] ABSTRACT

A light control device includes a bimorph element comprising two thin polyvinylidene fluoride films and a thin layer disposed therebetween to secure the films together. The bimorph element bends in accordance with an applied electric field to open or close an opening in a panel, thereby displaying a pattern, or to open or close a passageway of light, thereby performing a shutter operation.

3 Claims 37 Drawing Figures

LIGHT CONTROL DEVICE USING A BIMORPH ELEMENT

The present invention relates to a light control device using piezoelectric material, and, particularly, to a device for controlling the passage of light using a polymer piezoelectric bimorph element.

BACKGROUND OF THE INVENTION

Ceramic is conventionally known as a piezoelectric material. However, ceramic has drawbacks in that it is brittle and, if fabricated thin, it is easy to break. Since, as a practical matter, ceramic can not be made into thin films, a bimorph (a two layered element) made of a ceramic achieves only a small amount of bending upon the application of an electric field thereto. Recently, a thin polymer piezoelectric material has been employed in making a cartridge of a microphone, a speaker and a headphone. A bimorph element comprising films made of a mixture of $PVF_2$ (polyvinylidene fluoride) and PZT powder was reported by J. Ohga in a report presented to the Meeting of Technical Group on Electro Acoustics, and published in Sept. 27, 1972 by the Institute of Electronics and Communication Engineer of Japan. However, in the report the films were not stretched before a fabrication of the bimorph, therefore, the bimorph could not utilize the piezoelectric characteristics of $PVF_2$. Further, the bimorph including PZT powder had a thickness of 2.5 mm and was not made thinner.

Various prior art devices exist for controlling light. There are display devices in which a number of electric light bulbs are arranged, and the controlled on and off operation thereof is utilized. Such a display device consumes a large amount of power and is expensive to construct. Display devices utilizing controlled electron collision against a phosphor material or using a liquid crystal element can not be manufactured inexpensively on a large scale. Also known is a shutter device using a ceramic piezoelectric element. But such a device can not achieve an effective shutter function due to the relatively small amount of bending of the bimorph comprising the ceramic piezoelectric element, thus resulting in only a limited amount of light control.

SUMMARY OF THE INVENTION

The present invention provides a device for controlling the passage of light utilizing a thin polymer piezoelectric bimorph element which can attain a large amount of bending responsive to an electric field. The device is simple to construct, operated by a low voltage, and can be constructed inexpensively on a large scale. The bimorph element includes two sheets of $PVF_2$ film, preferably less than 10$\mu$ thick. A layer, preferably less than 1$\mu$ thick, is disposed between the films to secure them together. Electrodes are provided on the respective films for connection to a power source. The bimorph element is bent in accordance with the application of an electric field from the power source. Means are provided for mounting at least a portion of the bimorph element to vary the passage or reflection of light, so that the element is bent by the selective application of an electric field between a first position and a second position, thereby controlling the light to achieve display or shutter operation.

DESCRIPTION OF A PREFERRED EMBODIMENT

Figure 1A:
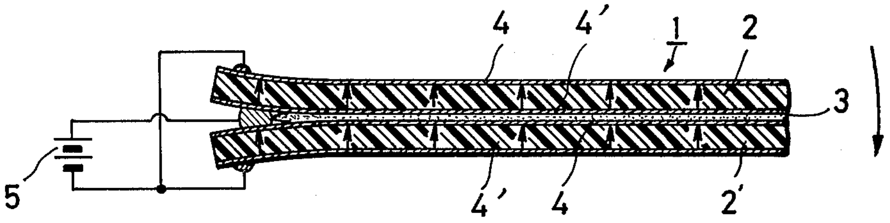
FIGS. 1A and 1B are side views of two kind of bimorph elements according to this invention and FIG. 1C is a perspective view of an assembly for manufacturing the bimorph elements of FIGS. 1A and 1B, FIGS. 2A and 2B are perspective views of embodiments according to this invention.
Figure 1B:
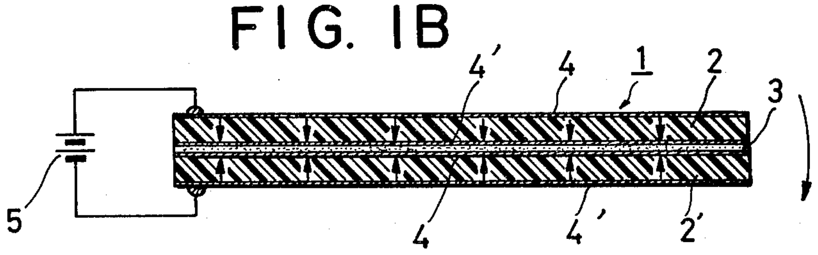

In FIG. 1A, a bimorph element 1 is formed by securing together two sheets of $PVF_2$ films 2 and 2' with a suitable layer 3 of fastening material. Electrodes 4 and 4' on the films 2 and 2' respectively, are connected to a power source 5. The $PVF_2$ film is, for example, 9$\mu$ thick. The electrodes 4 and 4' are deposited by evaporation of Al on the $PVF_2$ film. The $PVF_2$ film is first mechanically stretched at 65° C. to four times its original length. This makes chain molecules align to the stretched direction. Then, an electric field is applied normal to the film plane for the purpose of poling, since $PVF_2$ is ferroelectric-like. Suppose that the direction of polarization of the films 2 and 2' is the same as shown in FIG. 1A by an arrow and that an electric field of the opposite direction is applied to each film from a power source 5. As is well-known, ferroelectric material whose polarization direction is the same as that of the electric field extends and a ferroelectric material whose polarization direction is opposite to that of the electric field shrinks. Thus, the bimorph element comprising two $PVF_2$ films 2 and 2' can be bent to the side of the film 2' as shown by the arrow in FIG. 1A. If the polarization directions of two films are opposite each other, respective electrodes 4 and 4' can be arranged, as shown in FIG. 1B, to connect the power source 5 in such a manner that electric fields of the same direction are applied to the two films, causing the bimorph element 1 to be bent as described above. The thinner the bimorph element can be made, and the higher the voltage applied, the greater the bending of the bimorph element will be. Therefore, the bimorph element can be made as thin as needed to obtain the extent of bending desired.

Figure 1C:
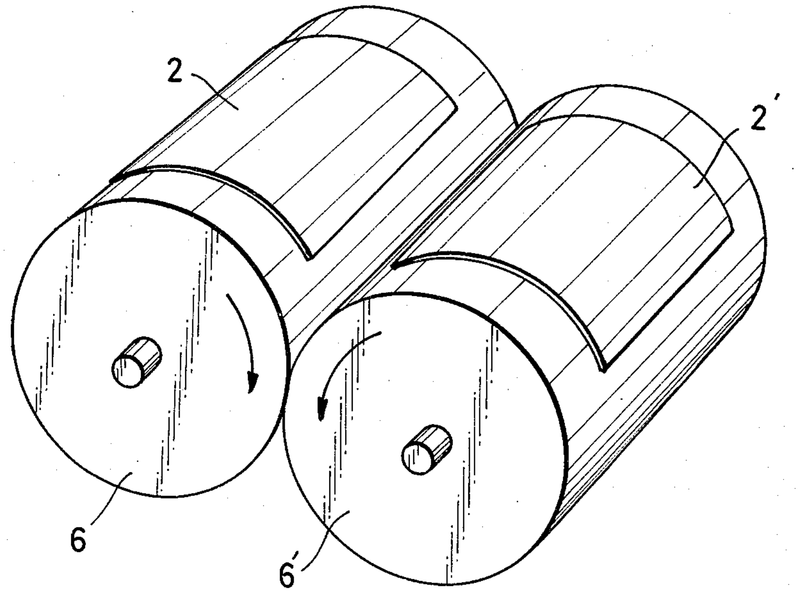

$PVF_2$ film has been difficult to secure to a surface with a sticking layer less than 10μ thick. It has been found that a bimorph element can be made with a sticking layer about 1μ thick by means of the following method. A sticking agent such as an epoxy resin is coated on one surface of a $PVF_2$ film and then is swept off by the end of a metal stick or paper to leave a very thin resin thereon. Another film processed similarly is superimposed on the first film. In the case of a film of larger area, as shown in FIG. 1C, two rollers 6 and 6' are provided adjacent to each other and two sheets of $PVF_2$ film are mounted to pass between the rollers. A sticking agent is coated on the upper-surface of the films. Static electricity is formed on that surface of a film which faces a roller, by use of a corona discharge by approaching an end of a wire to the film, with a high voltage applied thereto, so that the film sticks to the roller closely and electrostatically, and then, both rollers are caused to rotate inwardly, thereby pressing the two films through the sticking agent.

Accordingly, the present invention provides a thin bimorph element about 19μ thick in which two $PVF_2$ films 2 and 2' are respectively 9μ thick, the sticking layer 3 is 1μ thick and the electrodes 4 and 4' are about 2,000 A thick. As the $PVF_2$ bimorph is much thinner than prior art bimorph elements, the $PVF_2$ bimorph can be bent greatly. The bending radius R of the bent bimorph is generally given by the following equation in the case of the circuit connection shown in FIG. 1A with a thickness of a thin sticking layer disregarded.

$$R=\tfrac{8}{3}t^2/V1/d$$

where t is a thickness of each layer (μ), V is a voltage, d is a piezoelectric strain constant (for $PVF_2$: $80\times10^{-8}$ cgs esu). For example, R=20 cm for t=9μ, V=10 volts; R=2 cm for t=9μ V=100 volts; R=0.9 cm for t=6μ, V=100 volts; and R=0.5 cm for t=6μ, V=200 volts.

In the case of piezoelectric crystal or ceramic bimorph elements such a large curvature can not be obtained because of the difficulty in obtaining very thin self-supporting layers.

The amount of movement of a free end of the bimorph due to the bending is shown in the following Table.

TABLE

| Kind of Bimorph | Amount of Movement of a Free End of the Bimorph (μ) | Length of Bimorph (cm) | Voltage (V) | Thickness of one film forming the Bimorph (μ) |
|---|---|---|---|---|
| $PVF_2$ bimorph | 1,000 | 2 | 10 | 9 |
| " | 2,000 | 2 | 20 | 9 |
| " | 2,000 | 2 | 10 | 6 |
| " | 4,000 | 2 | 20 | 6 |
| Ceramic Bimorph | 4.4 | 2 | 10 | 300 |
| Ceramic Bimorph | 8.8 | 2 | 20 | 300 |

From the above Table, it is clear that the $PVF_2$ bimorph of the present invention achieves a larger amount of movement of its free end because of a thinner film forming the bimorph as compared with the conventional ceramic bimorph. In the case of a 2 cm long ceramic bimorph, it is difficult to make the thickness of the bimorph thinner than 500μ.

This invention provides a device for controlling light utilizing a large bending of a bimorph element comprising $PVF_2$ films and a sticking layer formed therebetween as above described, and various embodiments of this invention are explained hereinafter.

Figure 2A:
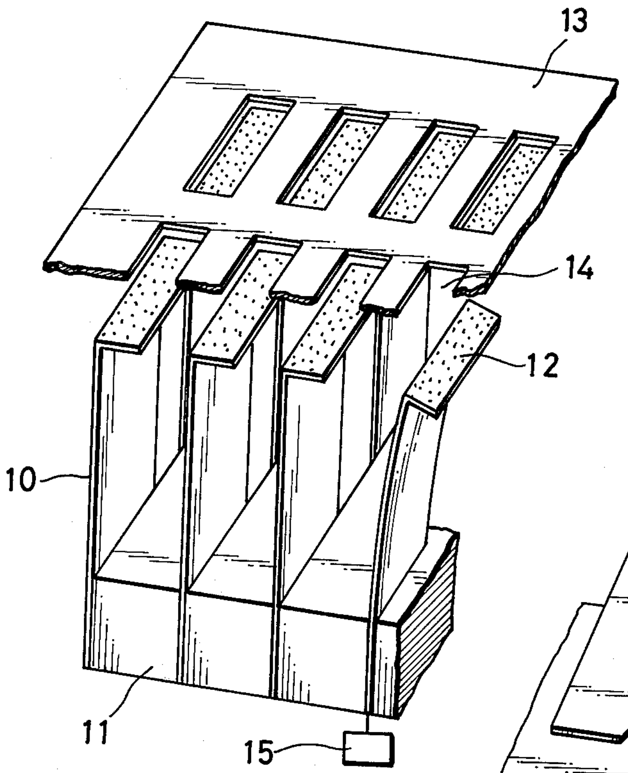
FIG. 2C is a perspective view of a modification of a member used in the embodiments of FIGS. 2A to 2B, FIGS. 3A and 3B are perspective views of embodiments according to this invention.

Referring to FIG. 2, ends of a plurality of bimorphs 10 each comprising two $PVF_2$ films as shown in FIGS. 1A or 1B and whose detailed construction is not shown in the following figures are supported by a substrate 11 in a horizontal relationship therewith and are arranged in a matrix configuration. The other end of each bimorph 10 is bent at a right angle or provided with a small display plate 12 at a right angle therewith. Each display plate 12 is formed and positioned on the same plane, and a panel plate 13 having holes 14 formed therein corresponding to the display plates 12 is arranged with the display plates 12 in the respective holes 14. Each bimorph 10 is connected to a power source 15 by a wire or printed conduction path as shown in FIGS. 1A or 1B. In the following drawings only a connection from one bimorph to the power supply is shown, but the other bimorph elements are likewise connected to power supplies (not shown).

Figure 2B:
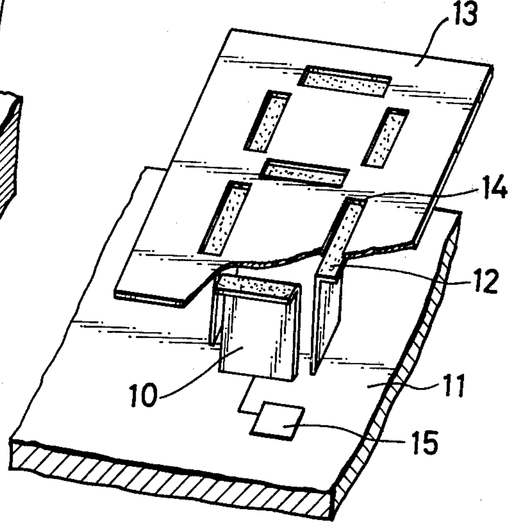
Figure 2C:
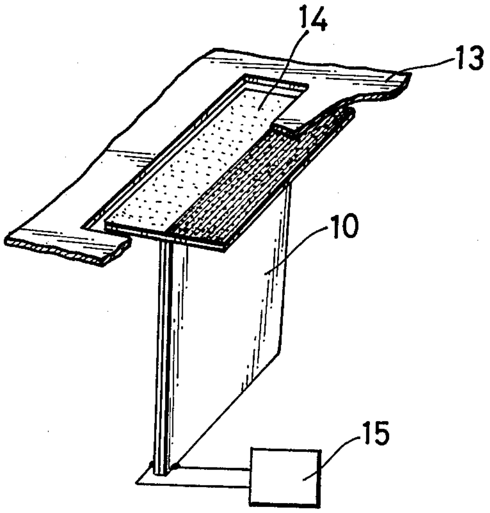

Upon the application of a voltage from the power supply 15, the tip of displaces due to bending the bimorph 10 as shown in the drawing in a direction perpendicular to the main surface thereof and in a direction to stretch the $PVF_2$ film. A desired pattern can be displayed when the respective display plates 12 are displaced from a position corresponding to holes 14. When the voltage is removed from the bimorph 10, the bimorph 10 returns to the initial state where it is perpendicular to the substrate 11 and the display plate 12 is also returned to the position corresponding to the hole 14. Thus, if the visible surface of the display plates 12 are formed in such a manner that they can not be distinguished from the surface of the panel plate 13, the aforementioned pattern disappears. If the surface of the display plates 12 are formed in such a manner that they can be distinguished from that of the panel plate 13, a pattern can be displayed when the display plates 12 are positioned corresponding to the holes 14. An interrelationship between the display plates 12 and the holes 14 can be adequately selected by controlling application of a voltage to the bimorph from the power source 15 by means of a suitable address circuit. In the embodiment shown in FIG. 2A, the bimorph element includes, by way of example, $PVF_2$ film 9μ thick, 1.6 cm high and 1.5 cm wide. The sticking layer is 1μ thick, the driving voltage +60 V, the unit area power consumption $7.9\times10^{-9}$ W/cm$^2$ upon application of the voltage, and the unit area power consumption $8.6\times10^{-6}$ n W/cm$^2$ upon repetitive operations at the switching speed 20 ms, where n is switching cycle per second, FIG. 2B shows an application of this invention in which bimorphs 10 are arranged to display a numeral "8". Any desired numeral can be displayed by the appearance or disappearance of the display plate 12 through hole 14 of the panel plate 13 by driving the bimorph 10 from the power supply 15. FIG. 2C shows the bimorph element having a display plate 16 whose surface has first and second regions making the regions visible differently. A display is performed depending on which region can be viewed from the hole 14 of the panel plate 13 in accordance with the bending of the bimorph 10. According to the embodiments shown in FIGS. 2A, 2B and 2C, a large scale display plate can be constructed and a pattern can be displayed clearly and viewed from a broad angle because of the technique of utilizing the appearance or disappearance of the display plate through the hole. The use of the thin $PVF_2$ bimorph element permits a considerable degree of bending with relatively low applied voltage in a display device of simple construction resulting in achieving a low power consumption.

Figure 3A:
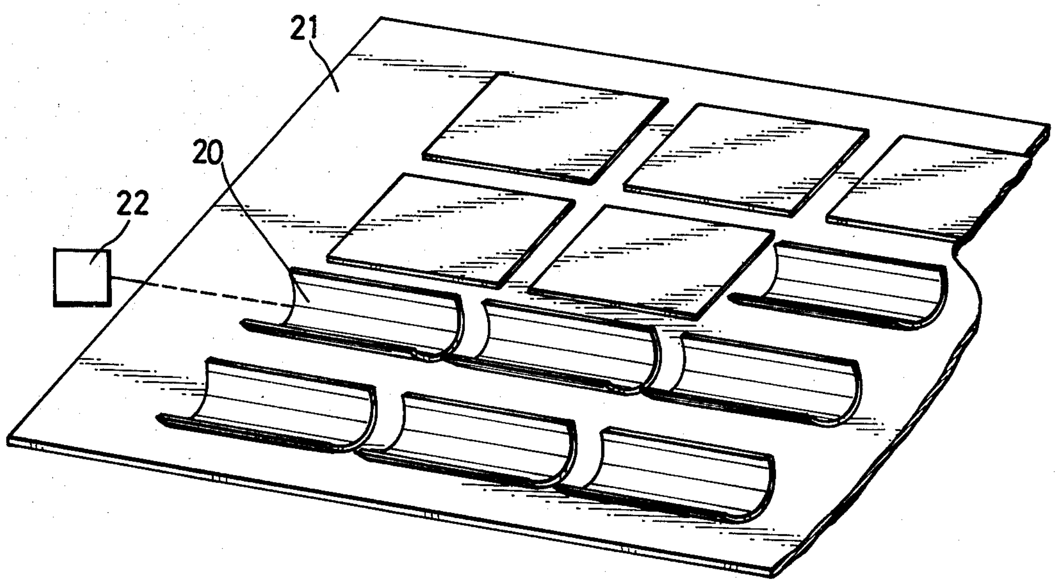
Figure 3B:
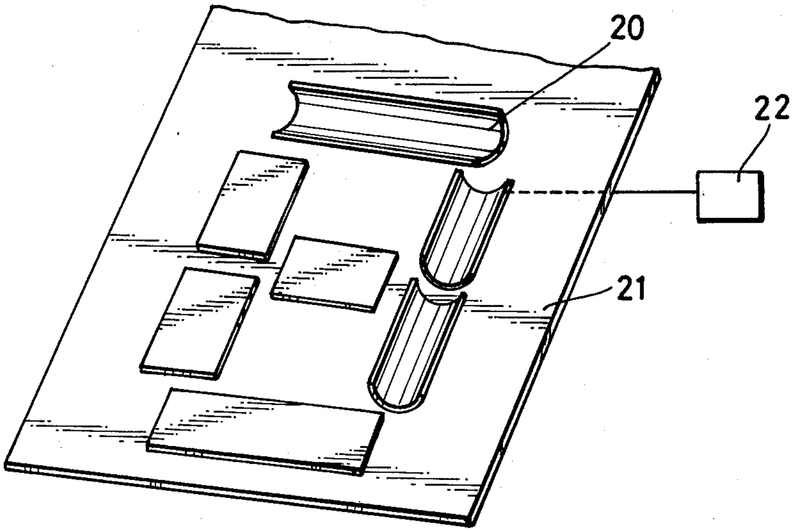

FIG. 3A shows a display device according to another embodiment of this invention. A plurality of bimorphs 20 are provided on the surface of a supporting substrate 21 so that the major surface of each bimorph 20 is in parallel relation to the substrate 21. The bimorph 20 is similar to the bimorph shown in FIGS. 1A or 1B except that a $PVF_2$ film forming the bimorph 20 was stretched along the shorter edge thereof, resulting in the bimorph being bendable along the shorter edge. Each bimorph 20 is fastened to the panel 21 by a suitable material which is provided around a central portion at the rear of the bimorph in parallel to the longer edge of the bimorph. When a voltage is applied to the predetermined bimorph 20 from the power source 22, the predetermined bimorph 20 is bent along its shorter edge, upwardly. It can be distinguished from the other bimorphs which are not bent due to a non-application of the electric field, thereby displaying a desired pattern. Where a $PVF_2$ film is 9μ thick, an applied voltage 200 V, a length of the bimorph along the shorter edge 3.14 cm, then the curvature radius of the bimorph is 1 cm and the bimorph will be bent in the form of a half circle. FIG. 3B shows an embodiment in which the bimorphs 20 are arranged in the form of the numeral "8" on the substrate and display a desired numeral depending on which set of the bimorph elements are bent.

Figure 4A:
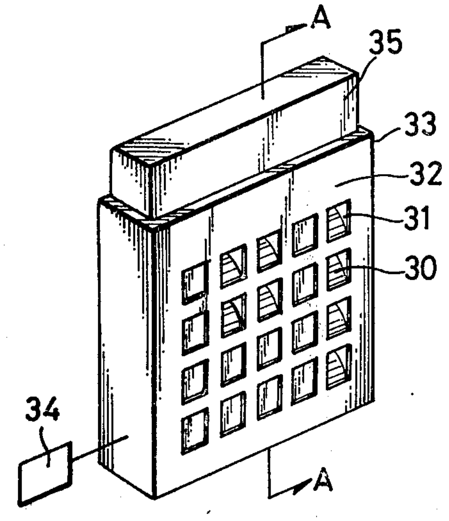
FIG. 4A is a perspective view of another embodiment of this invention and FIG. 4B is a cross sectional view of the embodiment shown in FIG. 4A along line A—A.
Figure 4B:
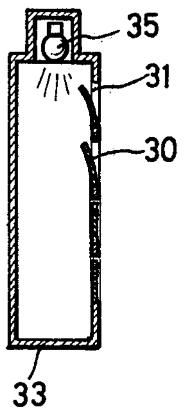

FIGS. 4A and 4B show an embodiment of this invention in which one edge of each bimorph 30 constructed as shown in FIGS. 1A and 1C is fixed to one side of its corresponding rectangular hole 31 formed in the surface panel 32 of a box 33. The other edge of each bimorph 30 can be bent upon an application of the electric field from a power source 34. The bimorph elements 30 are arranged to be in the same plane as the surface panel 32 of the box 33. A plurality of such bimorphs 30 provided in the holes 31 are arranged in a matrix form and a light source 35 is provided at one side of the box 33 to illuminate the inside of the box. When a predetermined bimorph 30 is driven by the power source 34 to be bent, light from the light source 35 passes outwardly by reflection through its corresponding hole 31 in the panel 32 of the box 33, thereby displaying a desired pattern.

Figure 5A:
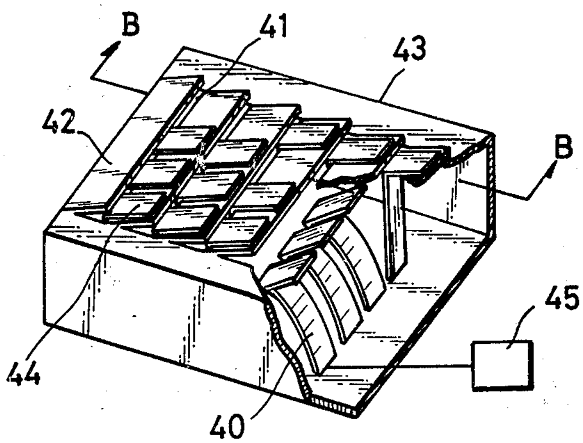
FIG. 5A is a perspective view of a further embodiment of this invention and FIG. 5B is a cross-sectional view of the embodiment shown in FIG. 5A along line B—B.
Figure 5B:
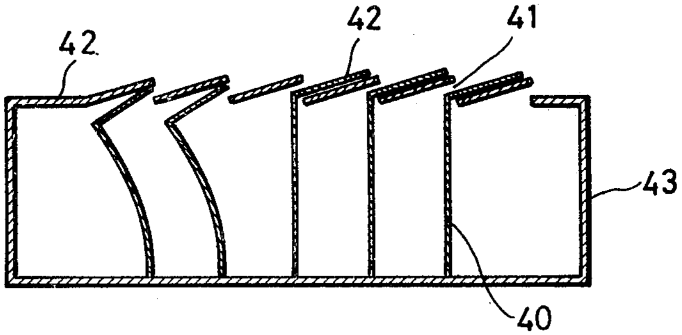

FIGS. 5A and 5B show still another embodiment of this invention in which the panel portion 42 of a box 43 is divided into several portions with each surface portion slanted in the same direction and with slit holes 41 formed between two-adjacent surface portions. One end of each bimorph element 40 is fixed to the bottom portion of the box 43 in correspondence with a slit hole 41. A display surface 44 formed at the other end of the bimorph 40 is slanted similarly to the surface panel 42 and passes through a slit hole 41 so that the display surface 44 covers the surface of the panel portion 42. When an electric field is applied to the bimorph 40 from a power source 45, the bimorph 40 is bent to draw the display plate 44 through the slit hole 41 toward the underside of the panel portion 42, thereby hiding the display plate 44 under the panel portion 42. A pattern can be displayed by the appearance or disappearance of the display surface 44 at the surface of the box 43 due to the bending operation of the bimorph elements 40. The bimorph elements used in the embodiments of FIGS. 4A, 4B, 5A, 5B move at their free ends by 2 mm where a $PVF_2$ film for the bimorph element is 9μ thick, the bimorph element is 2 cm long and the applied voltage is 20 V, as shown in the Table.

Figure 6A:
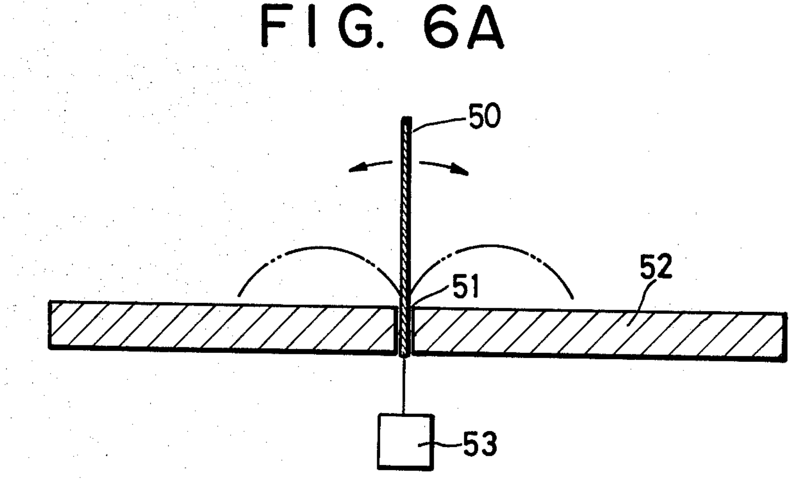
FIGS. 6A and 6D are cross-sectional views of embodiments of this invention.
Figure 6B:
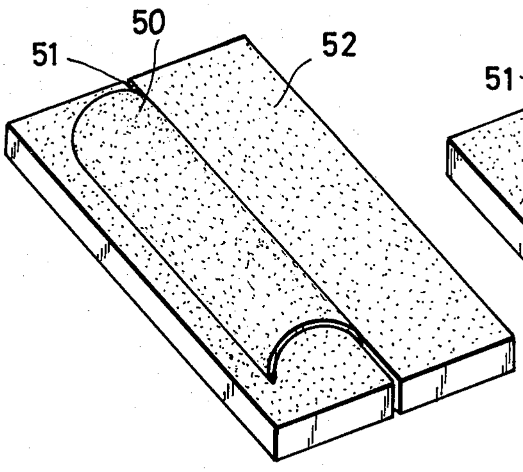
FIGS. 6B and 6C are perspective views of the embodiment shown in FIG. 6A.
Figure 6C:
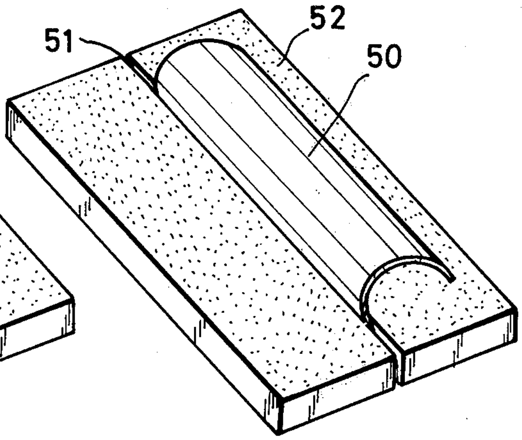
Figure 6D:
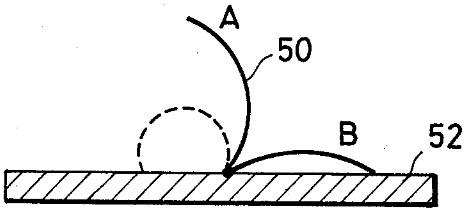

As shown in the embodiment of FIGS. 6A through 6D, one edge of a $PVF_2$ bimorph element 50 is fixedly inserted into a slit 51 formed in a substrate 52 and connected to a power source 53. One surface of the bimorph element 50 is formed in such a manner that it is difficult to distinguish that surface from the surface of the substrate 52, and the other surface of the bimorph 50 is formed to distinguish from the substrate 52. As the bending amount of the $PVF_2$ bimorph 50 is quite large, this embodiment enables a pattern to be displayed depending on whether an electric field is applied to bend the bimorph to display the surface of the bimorph which is difficult to distinguish from the panel 52 or to display the other surface of the bimorph which can be distinguished from the panel 52. In FIG. 6D, the bimorph 50 is bent as shown in position A upon absence of applied voltage and is supported by the substrate 52 in a slant relation therewith. When the bimorph is extended to take a position B, the bimorph 50 seems almost integral with the panel 52 and the upper surface of the bimorph at the position B is easy to distinguish from the surface panel 52. Where the length of that portion of the bimorph 50 which appears over the surface of the substrate 52 is 2 cm and a $PVF_2$ film 9μ thick, an applied voltage of 328 volts is needed to make the free end of the bent bimorph contact the surface of the panel 52 but about 250 volts are sufficient for a practical display.

Figure 7A:
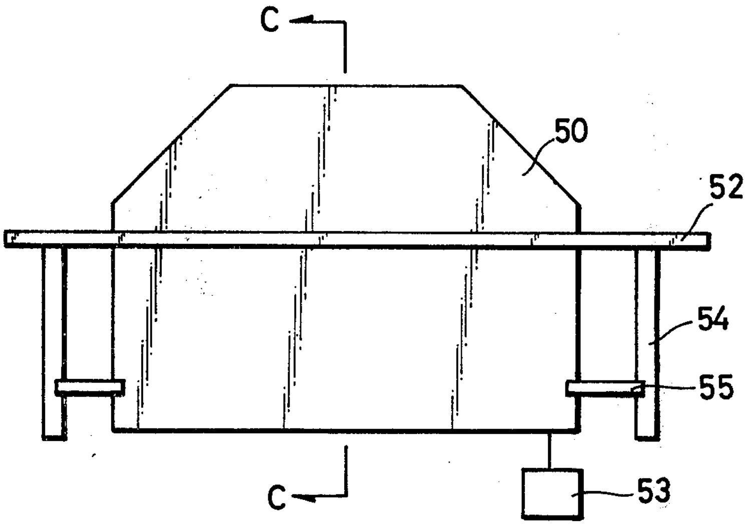
FIG. 7A is a side view of a still further embodiment of this invention and FIG. 7B is a cross-sectional view of the embodiment shown in FIG. 7A along line C—C.
Figure 7B:
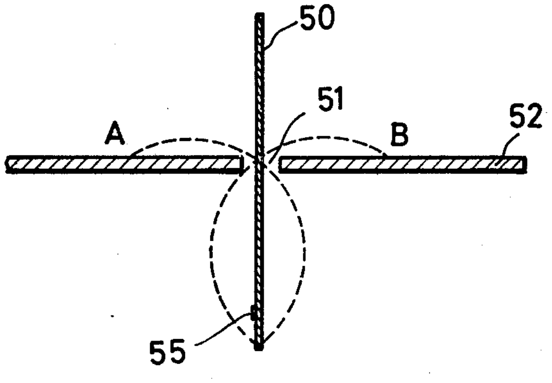

FIGS. 7A and 7B show a modification of the embodiment shown in FIGS. 6A to 6D. The bimorph 50 passes through the slit 51 formed in the panel 52. The bimorph is movably supported by a supporting member 54 spaced beneath the panel 52 through a tape 55, for example. In this modification, that portion of the bimorph 50 which appears over the panel 52 has the same length as that of the portion of the bimorph beneath the panel. Where the bimorph is 4 cm long with a $PVF_2$ film 9μ thick, 164 volts is required to provide a curvature radius of 1.28 cm, thereby making a free end of the bent bimorph contact the panel 52, but 120 volts is sufficient for a practical display. The embodiment shown in FIGS. 7A and 7B requires almost half the applied voltage necessary for the embodiment shown in FIGS. 6A to 6D. The bimorph element supported by the slit 51 at the central region is not affected by mechanical force such as gravity and by the mounting direction of the assembly including the bimorph element.

Figure 8A:
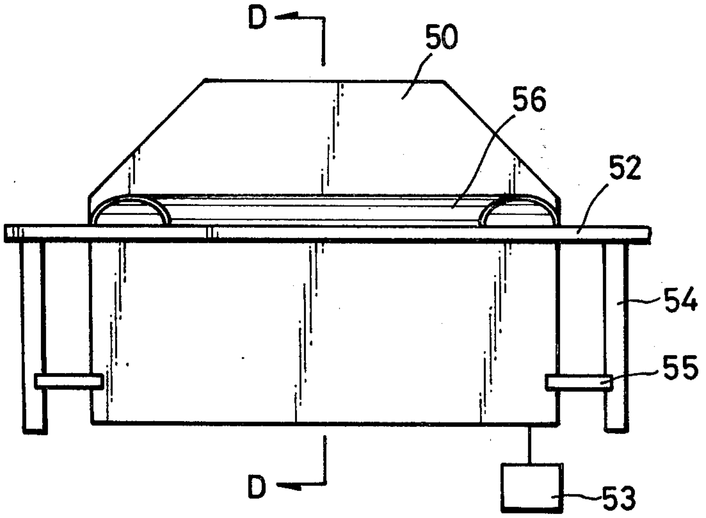
FIG. 8A is a side view of an embodiment of this invention.
Figure 8B:
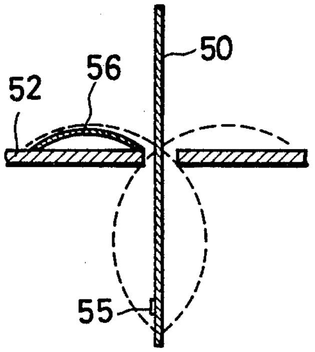
FIG. 8B is a cross-sectional view of the embodiment shown in FIG. 8A along line D—D.
Figure 8C:
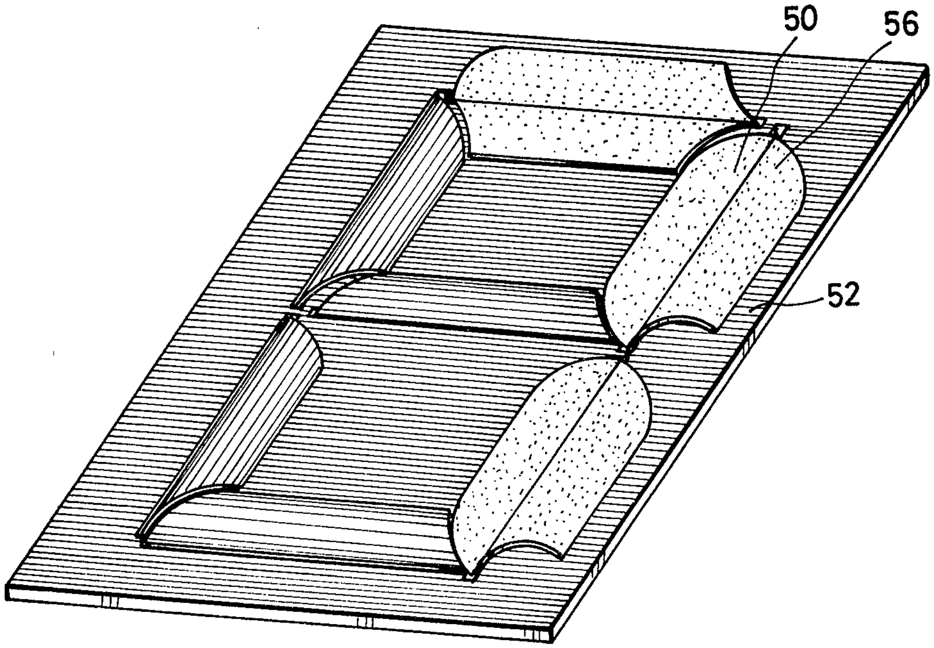
FIG. 8C is a perspective view of one embodiment of this invention fabricated using the bimorph element shown in FIG. 8A.

In FIGS. 8A and 8B, an auxiliary plate 56 having a shape similar to that portion of the bimorph element 50 at the surface of the panel 52 is arranged along the panel 52 with the visible surface of the auxiliary plate 56 distinguishable from the panel surface 52. The upper-surface of the bimorph element 50 is made visibly distinguishable from the panel 52 when the bimorph element 50 is bent opposite to the auxiliary plate 56. The under-surface of the bimorph element 50 is made difficult to distinguish from the panel 52. Thus, when the bimorph element 50 is bent to cause the surface distinguishable from the panel 52 to appear, the bimorph element 50 and the auxiliary plate 56 can display twice as large an area by the use of a single bimorph element 50. FIG. 8C shows a numerical display using an assembly as shown in FIGS. 8A and 8B.

Figure 9:
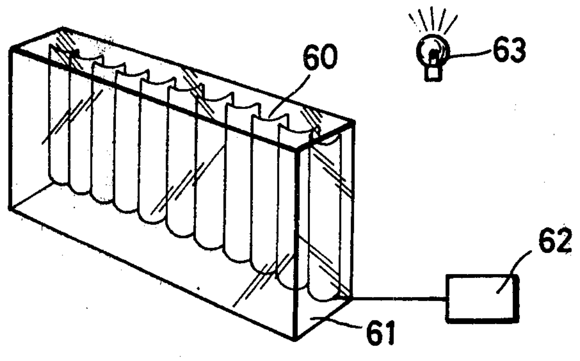
FIG. 9 is a perspective view of an embodiment of this invention.

In FIG. 9, a plurality of bimorph elements 60 are arranged inside a transparent box 61 made of glass, for example, and fixed at their ends to the box 61, in such a manner that they are normally parallel to each other. The free end of each bimorph element contacts at the fixed end of the adjacent bimorph element when they are bent upon an application of the electric field from the source 62. A light source 63 is provided outside (or inside) the box 61. When the bimorph is bent, the light is prevented from passing between the adjacent bimorphs and when the bimorph is returned to the normal state, the light passes therebetween, thereby displaying a pattern to the person sitting at the side of the bimorph opposite to the light source.

Figure 10A:
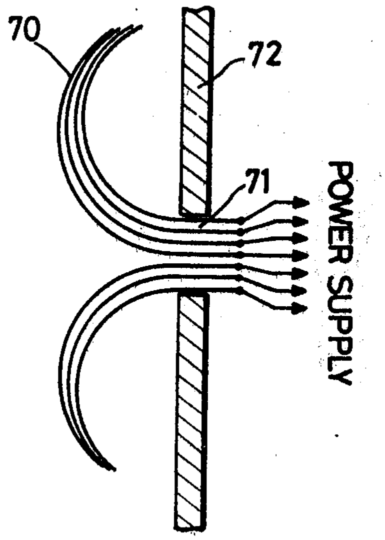
FIGS. 10A and 10B are respectively a cross-sectional view and a perspective view of an embodiment of this invention.
Figure 10B:
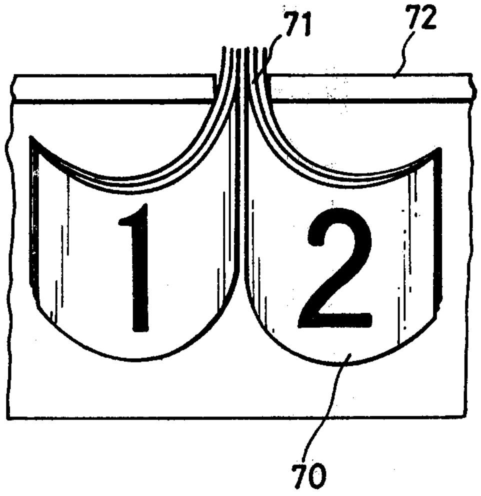

In FIGS. 10A and 10B, a plurality of bimorphs 70 which are layered together are fitted into a slit 71 of a panel 72 at one end thereof and are respectively connected to the power supply, so as to control one group of the bimorphs toward one bending direction and the rest toward the opposite bending direction in accordance with the direction of applied electric fields, with a result that the bimorphs 70 are caused to open like a notebook as shown in FIG. 10B to display a pattern on two opposite bimorph elements. Where the bimorph is 2 cm long and a $PVF_2$ film is 9μ thick, 328 volts is needed for full opening of the notebook type device but 250 volts is sufficient practically.

Figure 11A:
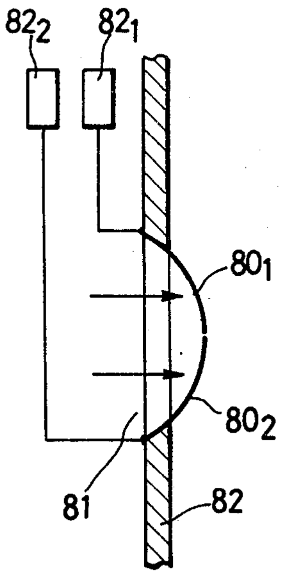
FIGS. 11A, 11B and 12A, 12B are respectively cross-sectional views of further embodiments of this invention.
Figure 11B:
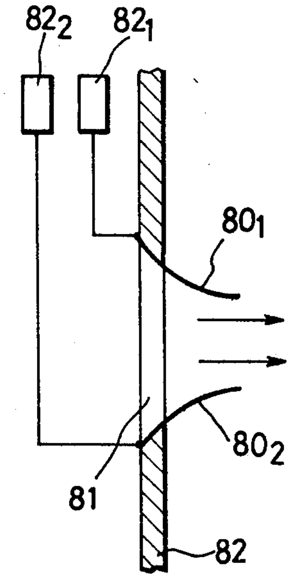

FIGS. 11A and 11B show a still further embodiment of this invention in which one side of a $PVF_2$ bimorph $\mathbf{80_1}$ is fixed to one end of a hole 81 in a panel 82 and likewise one side of another bimorph $\mathbf{80_2}$ is fixed to the other end of the hole 81, while the free ends of bimorphs $\mathbf{80_1}$, $\mathbf{80_2}$ which are not fixed are arranged to contact one another. By application of an electric field to the bimorphs from a power source $\mathbf{82_1}$, $\mathbf{82_2}$, the bimoprh $\mathbf{80_1}$, $\mathbf{80_2}$ are caused to be bent. When the two bimorphs are bent in one direction, the free ends of the two bimorphs are closed to prevent the passing of light (FIG. 11A). When they are bent in the other direction, their free ends open to enable the passing of light (FIG. 11B). Where the bimorph is 2 cm long and a $PVF_2$ film is 9μ thick, ±83 volts is needed to obtain a curvature of 2.54 cm, which is sufficient for a practical shutter.

Figure 12A:
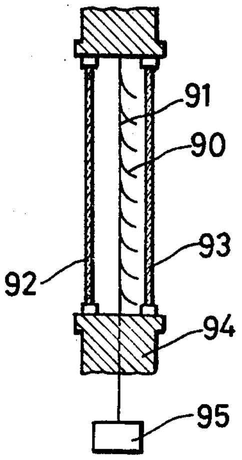
Figure 12B:
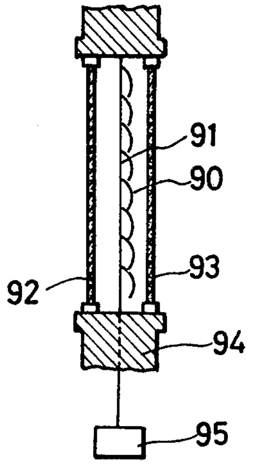

In FIGS. 12A and 12B, one end of each of the bimorphs 90 is supported by a transparent supporting member 91 provided between a glass plate 92 and a transparent protection layer 93 which are disposed parallel to each other and are fixed to a panel 94. The free end of each bimorph 90 is arranged to superimpose on the fixed end of the adjacent bimorph. The bimorph 90 is the same as that used in the embodiment shown in FIG. 9. Where the bimorph is 2 cm long, and the $PVF_2$ film is 9μ thick, ±165 volts is required to obtain a curvature radius 1.27 cm of the bimorph, which is necessary for a practical shutter. Light is controlled by the opening and closing operation of the bimorphs to which a suitable voltage is applied from a power source 95, thereby to provide a novel blinder apparatus.

Figure 13A:
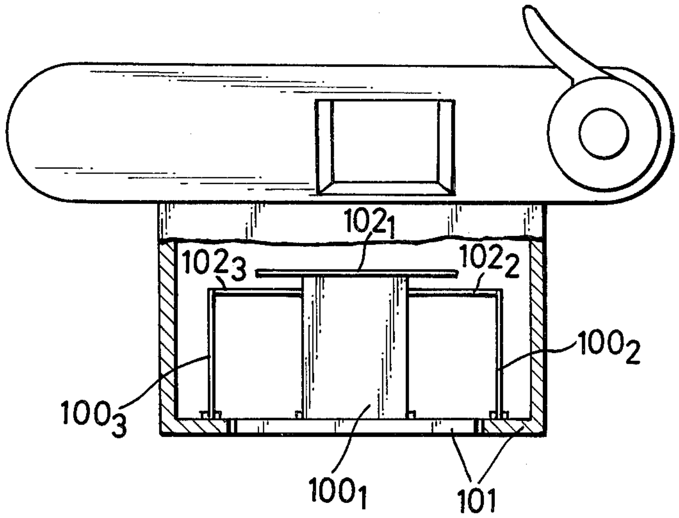
FIG. 13A is a partially cross-sectional view of an embodiment of this invention.
Figure 13B:
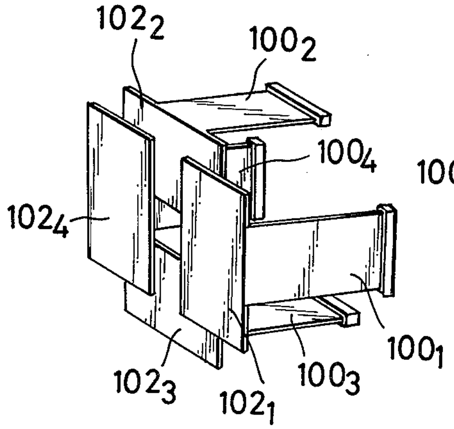
FIGS. 13B and 13C are perspective views of the bimorph elements used in the embodiment shown in FIG. 13A, FIGS. 14 and 15 are respectively perspective views of embodiments of this invention.
Figure 13C:
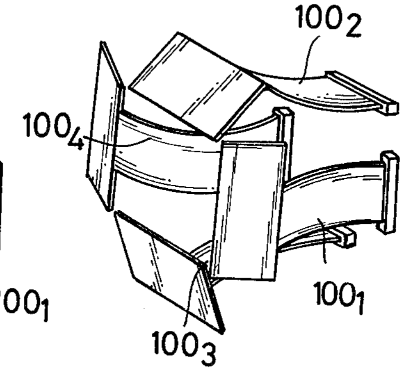

In FIGS. 13A, 13B and 13C, four bimorphs $\mathbf{100_1}$, $\mathbf{100_2}$, $\mathbf{100_3}$, and $\mathbf{100_4}$ are arranged to form a rectangular configuration. One end of each bimorph is fixed to a member 101 for forming a lens assembly in a camera body, for example. Shutter plates $\mathbf{102_1}$, $\mathbf{102_2}$, $\mathbf{102_3}$, $\mathbf{102_4}$ are provided at the other ends of the respective bimorphs to overlap each other. When the respective bimorph elements are bent outwardly, a rectangular hole formed by the four shutters becomes larger, thereby providing an iris of a camera. The extent each bimorph bends is controlled by an electric field from a solar cell, for example, (not shown) thereby to restrict the size of the iris hole and the amount of light passing through the iris. Where the bimorph is 2 cm long, 100 volts is required for a movement of 1 cm by a free end of the bimorph.

Figure 14:
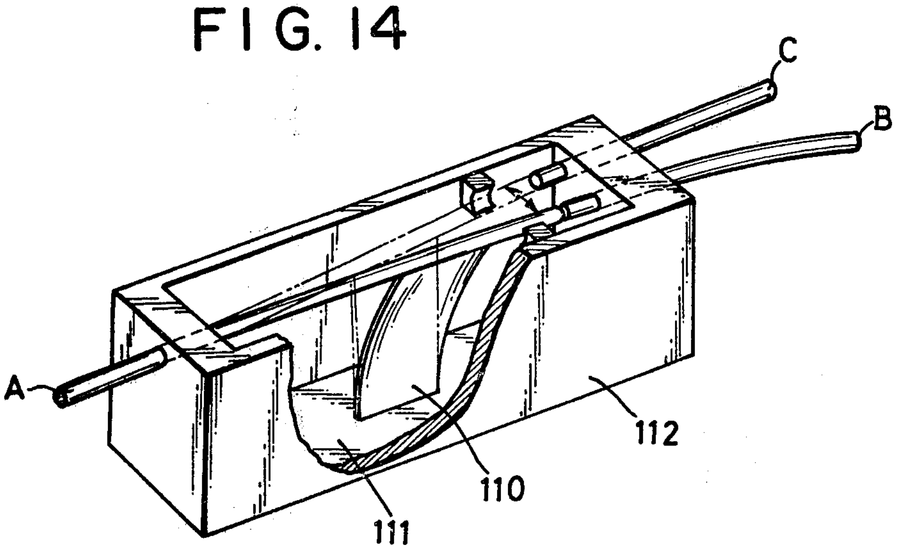

In FIG. 14, there is provided a switching device for a fiber light transmission line in which one end of a bimorph 110 is fixed to a bottom 111 of the box 112 and the other end of the bimorph is connected to an optical fiber A. Upon application of an electric field to the bimorph 110 from a power source (not shown), the bimorph 110 is caused to be bent, thereby changing the position of the fiber A from a usual connection with fiber B to a connection with fiber C.

Figure 15:
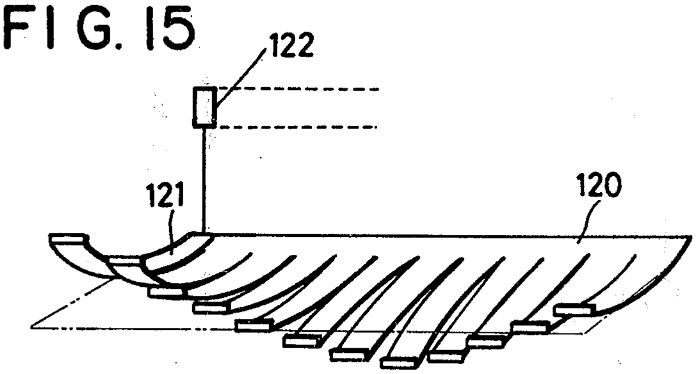

In FIG. 15, a sheet-like bimorph element 120 is formed in a comb-like shape. One edge of the bimorph is divided into many branches to form branch bimorphs. An electrode 121 is coated on each of the branch bimorphs separately (not shown) so that each of the branch bimorphs can be controlled independently. The branch bimorphs are connected to power supplies 122 respectively, only one of which is shown. When the viewer looks at the branch bimorphs in a direction parallel to and along the length of the bimorph element, the branch bimorphs represent a pattern in accordance with the different amounts the respective branch bimorphs are bent.

Figure 16:
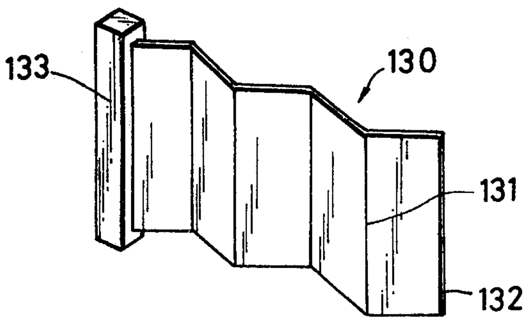
FIG. 16 is a perspective view of an embodiment of the bimorph element used in this invention.

In FIG. 16, a plurality of folds 131 which are in parallel to the non-bending edge 132 of the bimorph 130 are provided in the bimorph 130 whose end is supported by a supporting plate 133. The folds 130 tend to prevent the $PVF_2$ bimorph from being distorted due to its small thickness and weak self-sustaining capability when no electric field is applied.

Figure 17A:
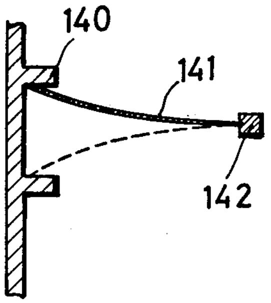
FIGS. 17A to 17C are side views of a bimorph element device usable in this invention.
Figure 17B:
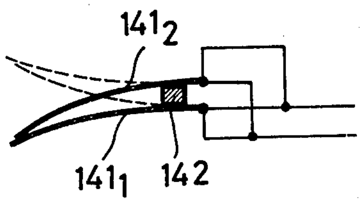
Figure 17C:
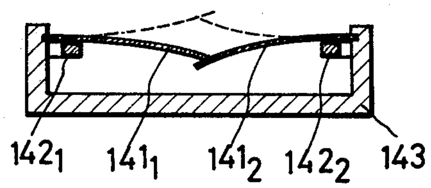

When the bimorph used for this invention is energized by a stepwise voltage, it has been found that the free end of the bimorph displaces but following a damped oscillation at the resonate frequency, i.e. performs a ringing operation, and does not stop right away. In FIG. 17A, a stopper 140 is provided at the position where the free end of the bimorph 141 supported by a supporting member 142 should stop and the stopper may be positioned within the range of the displacement of the bimorph due to the electric field. In FIG. 17B, the fixed ends of two bimorphs $\mathbf{141_1}$ and $\mathbf{141_2}$ are spaced apart from each other and supported by a supporting member 142 with their free ends contacting each other to thereby damp the ringing of the bimorph by the friction between the two bimorphs. In FIG. 17C, one end of a bimorph $141_2$ is fixed to a support $142_2$, and one end of a second bimorph $141_1$ is fixed to a support $142_1$. The free ends of the bimorphs contact each other. The supporting members $142_1$ and $142_2$ may be mounted on a supporting body 143. The modification shown in FIG. 17C also damps the possible ringing of the bimorphs owing to a friction between the two bimorph element.

What is claimed is:

1. A device for controlling light comprising a bimorph element including two polyvinylidene fluoride films with a thin layer disposed between said films for securing them together, electrodes being provided on said films for connection to a power source, and means for supporting said bimorph element in a structure with said element moveable between a first position and a second position in accordance with the application of an electric field from said source to thereby control the passage of light, said structure comprising a panel with a slit formed in the panel, said bimorph element being moveably inserted into the slit and including a first surface which is viewable in one manner with the surface of said panel and a second surface which is viewable in another manner with the surface of said panel, said bimorph element in said first position having said first surface displayed against the surface of said panel and in said second position having said second surface displayed against the surface of said panel.

2. The device according to claim 1 in which said bimorph element is supported at one end with said bimorph element passing through said slit at the mid-point of said element.

3. A device for controlling light comprising a bimorph element including two polyvinylidene fluoride films with a thin layer disposed between said films for securing them together, electrodes being provided on said films for connection to a power source, and means for supporting said bimorph element in a structure with said element moveable between a first position and a second position in accordance with the application of an electric field from said source to thereby control the passage of light, said structure comprising parallel transparent members and a mounting member disposed between said transparent members, one edge of each of a plurality of said bimorph elements being fixed to said mounting member with the free end of each bimorph element in said first position overlapping said fixed edge of an adjacent bimorph element and with the free end of each bimorph element in said second position being spaced from said fixed edge of said adjacent bimorph element.

* * * * *